United States Patent [19]  [11] 4,110,241
Pirkulov et al.  [45] Aug. 29, 1978

[54] METHOD OF MANUFACTURING ACTIVE MATERIAL FOR LEAD BATTERIES

[76] Inventors: Vladimir Georgievich Pirkulov, prospekt A. Tsereteli, 101, kv. 27; Mikhail Arkadievich Askarov, ulitsa Makashvili, 1; Avtandil Vladimirovich Dzhashi, ulitsa Ioseliani, 20ᵃ, all of Tbilisi, U.S.S.R.

[21] Appl. No.: 796,066
[22] Filed: May 12, 1977
[51] Int. Cl.² ............... H01M 4/62; H01M 4/56; H01M 4/57
[52] U.S. Cl. ............... 252/182.1; 429/217; 429/225; 429/228
[58] Field of Search ........ 252/182.1; 429/217, 429/225, 228, 234

[56] References Cited
U.S. PATENT DOCUMENTS 3,864,169  2/1975  Cestaro ........................... 429/225
3,898,099  8/1975  Baker ............................ 252/182.1
4,011,374  3/1977  Kaun ............................. 252/182.1

Primary Examiner—Benjamin R. Padgett
Assistant Examiner—Irwin Gluck
Attorney, Agent, or Firm—Lackenbach, Lilling & Siegel

[57] ABSTRACT

To obtain the active material of lead batteries one of the initial components, that is, acid-resistant fibres are settled in an electric field on a horizontal continuously moving band, the fibres being oriented square to the band and subsequently the band is covered with lead powder which fills the gaps between the fibres, the thickness of the layer corresponding to the length of the synthetic fibres. Introduced into the obtained mixture is sulphuric acid and water. The method according to the invention has made it possible to improve the strength characteristics of electrodes thereby extending the life of batteries by 25 - 30 per cent.

2 Claims, 1 Drawing Figure

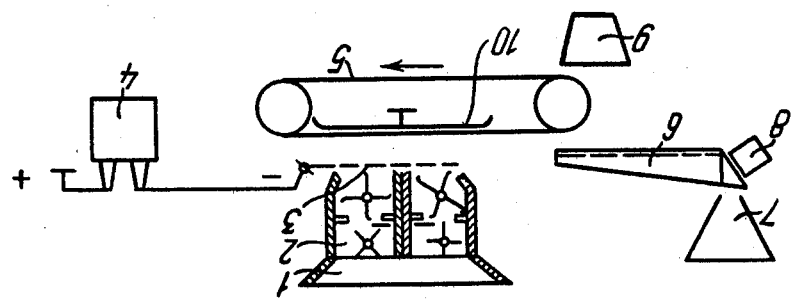

METHOD OF MANUFACTURING ACTIVE MATERIAL FOR LEAD BATTERIES

The present invention relates to electrical industry and more particularly it relates to the methods of manufacturing an active material for lead batteries.

The invention will be used extensively in the production of lead batteries.

Known widely at present is a method of promoting the mechanical strength of electrodes in lead batteries by introducing a fibrous binder into the active material of electrodes, said material consisting of lead powder, sulphuric acid and water. The fibrous binder is constituted usually by synthetic acid-resistant fibres characterized by sufficient strength properties. The synthetic fibres uniformly distributed among the particles of lead powder form a sort of reinforcing grid which binds the lead particles additionally. In the usual course of service, the surface layer of the active material of the lead electrodes gradually deteriorates accumulating on the battery bottom and short-circuiting the adjacent electrodes of opposite signs. This short-circuiting ruins the battery. By introducing synthetic fibres the deterioration of the surface layer is drastically slowed down thus extending the service life of the batteries. Th synthetic fibres are introduced into the material in the following proportions to the weight of the lead powder: from 0.1:99.9 to 0.6:99.4, depending on the type of battery and kind of fibres.

The mixture of lead powder with synthetic fibres should be characterized by a highly uniform distribution of the mixed components.

However, the existing methods of mechanical mixing fail to produce the uniformly distributed mixture of said components due to a great difference in the specific weights and volumetric quantities of the lead powder and synthetic fibres. In the mechanical mixers of, say, auger type, the fibres are mixed with the lead powder in separate zones of the mixer and do not fall apart later. The coefficient of mixture variation grows higher than 20%. However, the obtained mixture has zone containing no reinforcing fibres and the life of the storage batteries with such an active material is not expected to be long. The most practicable measure is to mix the component in an electric field, directing the particles of lead and synthetic fibres of opposite signs previously charged by the forces of an external electric field towards one another. As said particles, approach to certain minimum distances from one another, Coulomb's forces of attraction arise which join said articles to form aggregates from the components being mixed. By controlling the strength of charge on the components being mixed, it becomes possible to join a certain number of lead powder particles with synthetic fibres. This method can be realized with the aid of an electric mixer comprising hoppers with batchers for the components being mixed, charging devices for giving the components electric charges of opposite signs, a system of high-voltage and grounded electrodes, a device for fixing the produced aggregates, a receiving hopper and a source of high voltage.

The components are mixed as follows. The components "A" and "B" are batched and fed simultaneously into charging devices where they acquire charges of the positive and negative signs, respectively. Then the charged components move into the electric fields created by the high-voltage (−) and (+) and a common grounded electrode. In these fields the particles are acted upon by an electric force which brings the particles of the components nearer to one another and in the zone of action of the fixing forces (heating) said particles form aggregates. Hence, formation of aggregates is possible under the conditions when the quantities of the mixed components are commensurable with each other. When the amount of one of the components is much larger than that of the other component, the fixing zone will contain accumulations of particles of one of the components along (of that one whose amount is bigger). Thus, the prepared mixture at the outlet from the device will have irregularly distributed components.

An object of the present invention resides in eliminating the aforesaid disadvantages.

An object of the present invention resides in providing a method of producing an active material for lead batteries which would improve the strength characteristics of electrodes in lead batteries.

Still another object of the present invention resides in providing a method of producing an active material for lead batteries which would extend the service life of said batteries as compared with the known batteries.

This object is accomplished with an active material of lead batteries obtained by introducing synthetic acid-resistant fibres, sulphuric acid and water into lead powder and, according to the present invention, the synthetic fibres are introduced into lead powder in an electric field by settling synthetic fibres on a horizontal continuously moving band of a semiconductor material, said fibres being oriented square to the band, and by subsequent filling of the gaps between the fibres by a layer of lead powder, the thickness of said layer corresponding to the length of the fibres.

It is practicable, according to the present invention, that the intensity of the electric field should be $E = (2\text{--}4) \cdot 10^5$ V/m.

The method according to the present invention has made it possible to realize the known techniques of reinforcing the active material of electrodes in lead batteries with synthetic fibres in which case uniform distribution of the fibres among the particles of lead powder produces a three-dimensional reinforcing system in the active material of electrodes of the lead batteries thus raising the strength characteristics of said electrodes. The reinforcing fibres uniformly distributed in the lead powder prevent the active electrode materials from deterioration in service thereby extending the life of lead batteries by 25 - 30%.

Other objects and advantages of the present invention will become apparent from the detailed description of the method of manufacturing the active material of lead batteries from the examples of its realization and from the accompanying drawings illustrating the technological process of said method.

The method according to the present invention allows the synthetic fibres of an acid-resistant material, such as polypropylene, polyvinyl chloride and fluoroplastic with a length varying from 2 to 6 mm to be mixed with lead powder. Synthetic fibres are introduced in a proportion of from 0.1:99.9 to 0.6:99.4 relative to the weight of the lead powder, depending on the type of the battery and the kind of fibres.

According to the present invention the fibres are delivered for mixing in batches onto a charged high-voltage electrode where the fibres acquire surplus charges. The charged fibres are delivered into an electric field created between the high-voltage electrode and the grounded electrode. Then a band from a semiconductor material is passed above the grounded electrode. The charged fibres in the electric field are acted upon by the forces of gravitation, electrostatic dissipation, a ponderomotive force and an electric force. The ponderomotive force is habitually neglected due to its insignificant effect. Under the influence of these forces the synthetic fibres are distributed in the interelectrode space at relatively equal distances from one another and move towards the grounded electrode in an oriented manner so that their longitudinal axes are parallel to each other and perpendicular to the grounded electrode. Settling on the surface of said moving band the fibres remain in the oriented state.

In view of a low conductivity of the fibre surfaces the charges have no time for flowing from the fibres into the ground so that the action of electrical forces remains after the fibres leave the zone of the external electric field. Depending on the size of the fibres and their material the intensity of the external electrical field is set within a range of $(2-4)\cdot 10^5$ V/m.

After the synthetic fibres settled on the band leave the zone of the external electric field, the gaps between these fibres are filled with a layer of lead powder, the height of said layer not exceeding the average size of the fibres.

If the height of the layer of lead powder exceeds the length of the fibres, the produced mixture will contain zones without reinforcing fibres and the strength characteristics of the produced mixture will be impaired. Conversely, if the height of the powder layer is smaller than the length of the fibres, the number of fibres in the mixture may prove to be larger than the preset proportion in which case the capacity of the lead batteries with the active material according to the invention is expected to be rather low.

The particles of lead powder settling on the surface of the fibres neutralize the remaining charges thus producing a neutral mixture at the mixer outlet, said mixture being guaranteed against lamination in the course of service, storage and transportation.

After uniform mixing of the lead powder with synthetic fibres this mixture is directed into a mechanical mixer where it is mixed with sulphuric acid and water. All these mixed components produce a paste of active material which is suitable for applying on the electrode grids of lead batteries.

The method according to the invention has made it possible to improve the strength characteristics of electrodes thus extending the life of batteries by 20 - 30%.

EXAMPLE 1

Propylene fibres 3 - 5 mm long and 20 microns thick are charged into a hopper 1 (FIG. 1) of a device for the metered supply of charged fibres, said device being made of a die-electric material and called flocator 2. The flocator 2 consists of two compartments, viz., a compartment for metered supply of fibres and a charging compartment with a high-voltage grid electrode connected to the negative pole of a d.c. high-voltage source 4. The grid electrode is made of parallel spiral filaments according to Author's Certificate No. 1918 89/28-12, USSR.

Installed under the flocator is a moving conveyor band 5 of a semiconductor material with a specific volume resistance of $10^8 - 10^{10}$ ohm.cm. The speed of the conveyor band is 0.3m/s (band width being 1.0 m) which ensures the capacity of the installation up to 3 t/h. A grounded electrode 10 is installed under the upper side of the conveyor band. Thus an electric field is created between the high-voltage and grounded electrodes 3 and 10, the intensity of said field being set within $(2-2.5)\cdot 10^5$ V/m at a distance of 0.1 m between the electrodes. The charged propylene fibres are settled in an oriented way on the conveyor band 5 and due to a low conductivity of the fibre surface, stay oriented after leaving the zone of the electric field. Installed after the flocator 2 above the conveyor band 5 is a vibratory feeder which delivers lead powder of the following fractional composition: amount of product retained on 016 sieve - not over 8%; amount of product passing through sieve 004 varies from 65 to 80%. This lead powder is loaded into a hopper 7 of said vibratory feeder 6 wherefrom it is supplied in metered quantities through the vibratory feeder 6 onto the conveyor band 5. Metering of the powder and its uniform distribution across the width of the band are controlled with the aid of the vibrating chute 8 of the feeder 6. The prepared mixture of lead powder with propylene fibres for the active material of the lead battery flows into a receiving hopper 9 from where it is directed for mixing with water and sulphuric acid.

EXAMPLE 2

Polyvinyl chloride fibres 2-4 mm long, 20 microns thick are delivered into the flocator 2 similar to that described in Example 1. The intensity of electric field in the interelectrode space is set within $(2.5-3)\cdot 10^5$ V/m. The speed of the conveyor band 5 is 0.3 m/s. The process of mixing is similar to that described in Example 1. The lead powder is metered by a vibratory feeder and the prepared mixture is loaded into the receiving hopper 9.

What we claim is:

1. A method of manufacturing an active material for lead batteries consisting in that a synthetic acid-resistant fibres are uniformly settled in an electric field on a continuously moving horizontal band of a semiconductor material, said fibres being oriented perpendicularly to said moving band; then said moving band is covered with lead powder which fills the gaps between the fibres in a quantity sufficient for creating a layer whose thickness corresponds to the length of said synthetic fibres; the obtained mixture of fibres with lead powder is removed from the band and mixed with sulphuric acid and water.

2. A method of manufacturing an active material for lead batteries according to claim 1 wherein the intensity of the electric field is equal to $E = (2-4)\cdot 10^5$ V/m.

* * * * *